Figure 3:
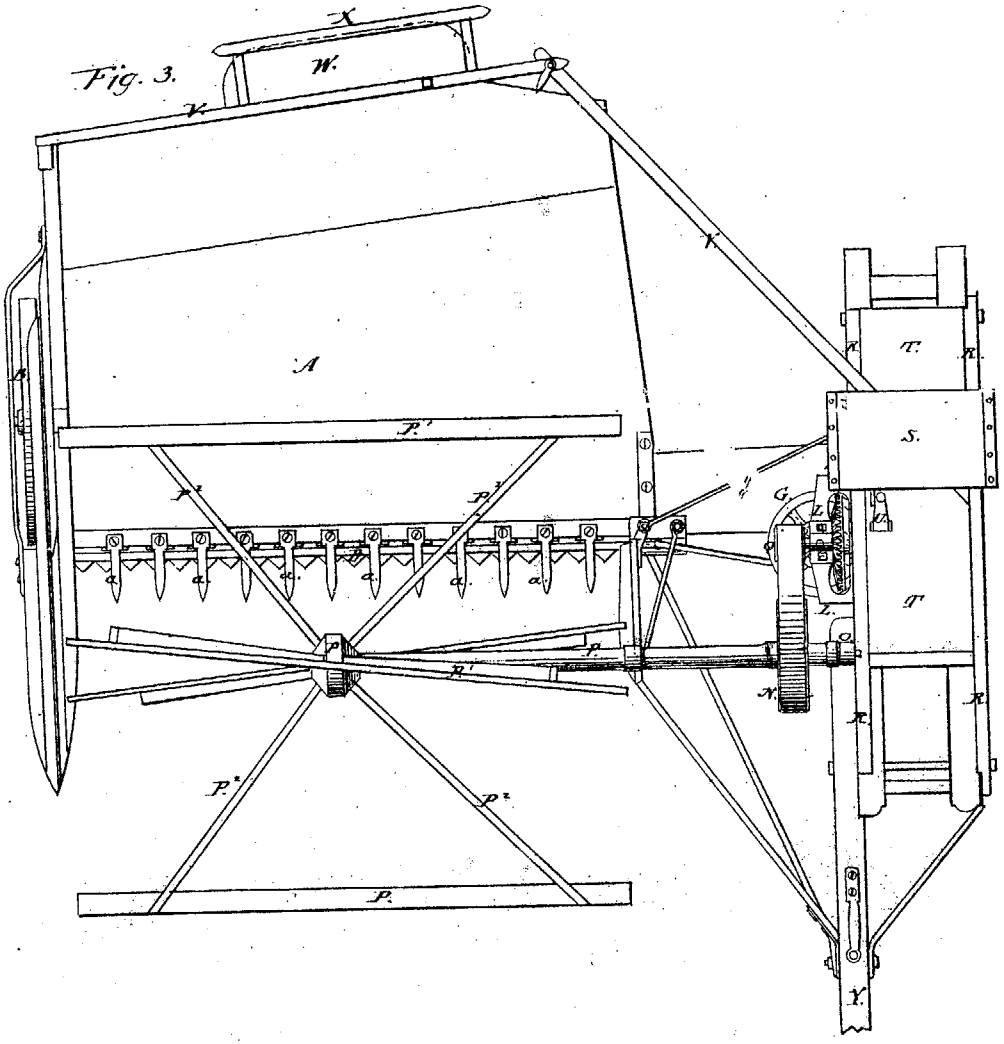

Sheet
W. H. Seymour.
Mower.
№ 511
Reissued Dec. 1, 1857.
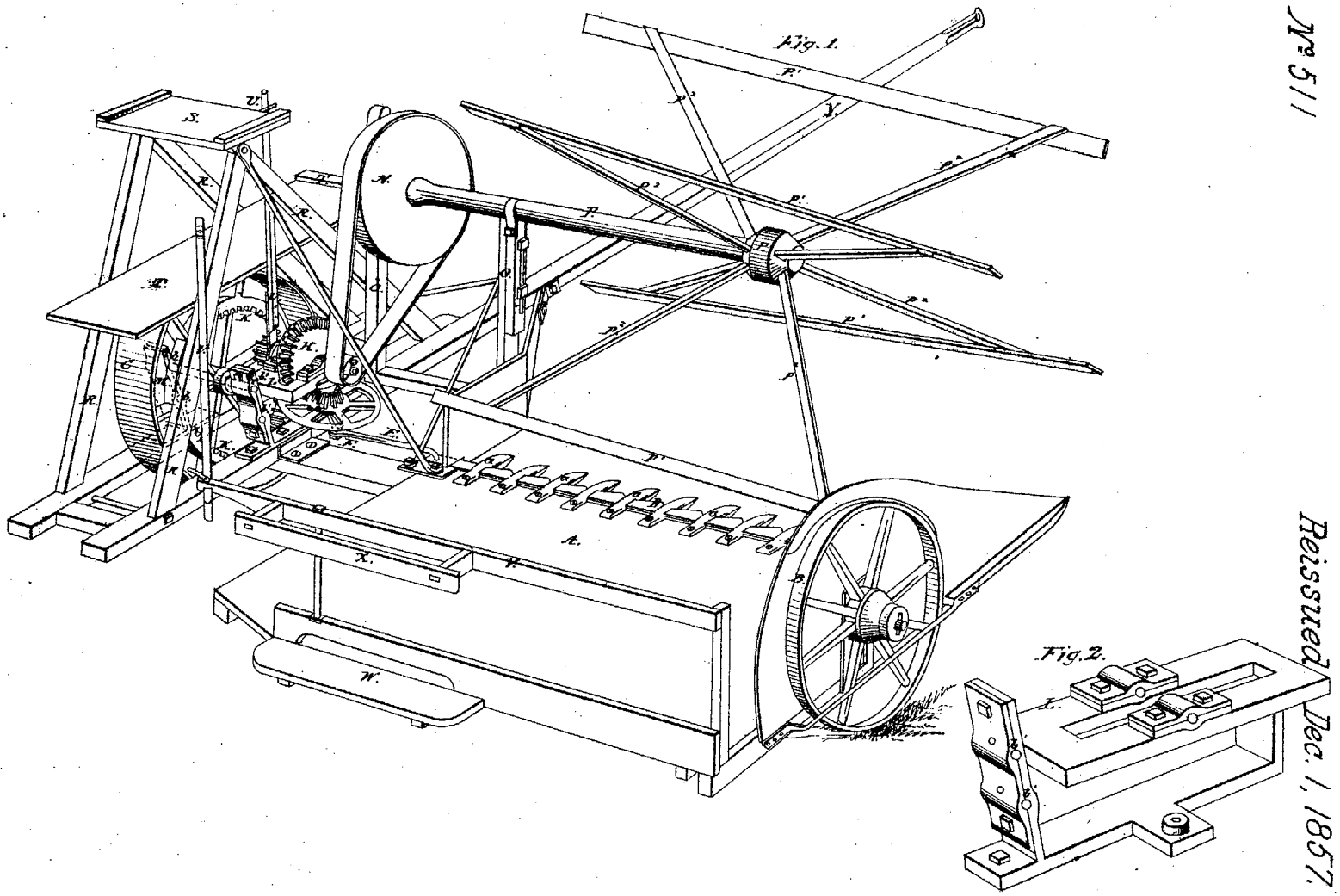

Sheet 2-2 Sheets.

W. H. Seymour.

Mower.

N° 511 Reissued Dec. 1, 1857.

UNITED STATES PATENT OFFICE.

WM. H. SEYMOUR, OF BROCKPORT, NEW YORK, ASSIGNOR TO HIMSELF AND DAYTON S. MORGAN.

IMPROVEMENT IN GRAIN AND GRASS HARVESTERS.

Specification forming part of Letters Patent No. 9,476, dated December 14, 1852; antedated October 25, 1852; Reissue No. 511, dated December 1, 1857.

*To all whom it may concern:*

Be it known that I, WILLIAM H. SEYMOUR, of Brockport, in the county of Monroe and State of New York, have invented a new and useful Improvement in Harvesting-Machines, of which the following is a full, clear, and exact description, reference being had to the accompanying drawings, which make part of this specification, and in which—

Figure 1 represents a view in perspective of a machine embracing my improvement. Fig. 2 represents a view in perspective of the rigid supplemental frame in which the bearings for the gearing are combined detached from the main frame of the machine, and Fig. 3 represents a plan or top view of the machine.

My invention consists in a new arrangement or disposition of the principal members or parts of the harvesting-machine, whereby many of the defects incident to the arrangement of the corresponding parts in previous machines are avoided and new advantages secured.

I have arranged the driving-gear at one side of the machine and at the other the platform to receive and carry the grain until a sufficient quantity for a gavel has accumulated, leaving a space between the driving-gear and platform for the discharge of the gavel. The draft-pole, to which the horses are harnessed, projects forward from the frame in front of the driving-gear. The stand for the forker, who discharges the grain, is on the rear edge of the platform. The cutter is placed on the front edge of the platform, with a reel above it. The seat for the driver is on the frame above the driving-wheel, and the frame is supported on two wheels like a cart. Under this arrangement, among other advantages, the machine is simple in construction, compact, and balanced without straining the frame. The position of the forker is such that he can discharge the grain at intervals from the platform with less exertion than is requisite under previous arrangements of the forker's stand upon the platform, and at the same time he can more readily reach with his fork the divider and cutting apparatus to dislodge straw or other matter that accumulates upon these members and would clog them if not removed.

The machine represented in the accompanying drawings consists of a strong frame carrying a platform, A, and supported by two wheels, one, B, to support the inner side of the machine, or that next the standing grain, and the other, C, at the other side. The latter is fitted with a cog-wheel to drive the gearing which imparts motion to the cutter and reel. The front edge of the platform A is fitted with a reciprocating sickle, D, of the usual construction, and with fingers *a* to enter between the stalks of standing grain and support them while being cut by the sickle. This sickle derives its reciprocating motion from a crank, F, with which it is connected by a link-rod, E. The crank F is turned by a pinion, G, driven by a bevel-wheel, H, on the inner end of a counter-shaft, I, whose outer end is fitted with a pinion, J, which gears into an internal spur-wheel, K, on the side of the main driving-wheel C. The shafts of this train of gearing are supported in suitable bearings in an auxiliary frame, L, which, being made rigid and strong, (in this instance it is made of cast-iron and in one piece,) keeps all the different parts of the gearing in their proper relative positions. As it is not essential that the outside journal of the driving-wheel should be supported in the supplemental frame when an internal gear-wheel, K, is used, this frame, to render it lighter, is made to support the inside journal only of the driving-wheel, the other journal being supported by a bearing, *b*, in a standard, M, which has a number of such bearings at different elevations corresponding to like bearings, *b'*, in the frame L. These series of bearings *b b'* are for the purpose of supporting the frame higher or lower on the axle of the driving-wheel, the opposite side of the frame being in like manner supported higher or lower in coresponding bearings for the supporting-wheel B, thus setting the platform A at a greater or less elevation from the ground, to carry the cutter at a correspondingly varied height, that it may sever the grain higher or lower as may be deemed expedient.

The reel for bearing the grain against the sickle and inclining it over the platform so that when cut it will fall thereon is supported by two posts, O, erected near the front of the outer end of the frame. These posts have a series of bearings formed in them to support the shaft P at different heights, to adapt the reel to the cutting of grain of different lengths, and the outer end of the shaft projects beyond the reel, so that the bearings in the posts by which it is supported are outside of the plane in which the outer ends of the vanes or ribs P′ turn. These vanes are supported by spokes $P^2$, extending from a central hub, $P^3$, at the inner extremity of the reel-shaft; but the spokes may be passed through the shaft in the usual manner, if preferred, the sole difference which it is necessary to make between this reel and those commonly used being to extend its shaft beyond the outer end of the vanes far enough to give room for two bearings at a sufficient distance apart to hold the reel steady without the necessity of employing a post to support its inner end. The reel is rotated by means of a belt which encircles a pulley, N, on the end of its shaft, and another pulley, Q, on the inner end of the counter-shaft I.

A triangular frame, R, is erected over the driving-wheel, upon the outer side of the main frame, to support the seat S and foot-board T of the driver or director of the machine. The foot-board has a lever, U, pivoted to it, by means of which a clutch on the counter-shaft can be shifted to throw the same into and out of gear with the internal spur-wheel, K. From the frame R a rail, V, extends, by means of which the rear of the platform and the forker's stand W are firmly supported. The stand W and railing X around it are to support the person who discharges the cut grain from the platform at suitable intervals. This stand allows the forker to perform his work in an easy and natural position, in which he is free to sweep his fork from end to end of the platform to remove the cut grain, and by having two forks of different shapes, which he can exchange from time to time, he can work with his right and left hand foremost alternately. The ample size and convenient arrangement of the stand permit the forker to change his posture at will, which facility is of great practical importance, as the seat for the raker or forker usually employed on harvesting-machines only admits of his sitting in a single position, and that one which restrains the freedom of his movement to an extent which exacts an undue exertion of particular muscles, and thus exhausts his strength much sooner than if he was free to change his posture from time to time, to ease one set of muscles by bringing another set into play.

The rear side of the platform and the stand for the forker are supported by a strong rail, V, extended from the outer side of the main frame across the space for the discharge of the grain, and at such distance above the ground and the platform that it will not hinder or obstruct the discharge of the gavel or disturb the same when discharged. This mode of supporting the rear side of the platform and the stand for the forker supersedes the caster-wheel that has sometimes been used for that purpose, and it also compensates for the support that is afforded by the draft-pole in those machines in which such a pole is extended backward from the platform and upheld behind by one or more wheels.

The machine is drawn by a team harnessed to a draft-pole, Y, which projects from the frame in front of the driving-wheel.

What I claim as new in my improved harvesting-machine, and desire to secure by Letters Patent, is—

The combination of the platform, the driving-gear, the space between the platform and driving-gear for the discharge of the gavel, the draft-pole, and the stand or rest on the platform for the forker when the same are arranged, substantially as described.

In testimony whereof I have hereunto subscribed my name.

WM. H. SEYMOUR.

In presence of—
HENRY W. SEYMOUR,
GEO. H. ALLEN.